US009930647B2

(12) United States Patent
Koc et al.

(10) Patent No.: US 9,930,647 B2
(45) Date of Patent: *Mar. 27, 2018

(54) ENHANCED NODE B AND METHOD FOR RRC CONNECTION ESTABLISHMENT FOR SMALL DATA TRANSFERS

(71) Applicant: Intel IP Corporation, Santa Clara, CA (US)

(72) Inventors: Ali T. Koc, Portland, OR (US); Maruti Gupta, Portland, OR (US); Rath Vannithamby, Portland, OR (US); Satish Chandra Jha, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 14/918,990

(22) Filed: Oct. 21, 2015

(65) Prior Publication Data
US 2016/0192410 A1 Jun. 30, 2016

Related U.S. Application Data

(63) Continuation of application No. 14/140,932, filed on Dec. 26, 2013, now Pat. No. 9,191,178.
(Continued)

(51) Int. Cl.
*H04W 72/04* (2009.01)
*H04L 5/00* (2006.01)
(Continued)

(52) U.S. Cl.
CPC .......... *H04W 72/0413* (2013.01); *H04B 1/38* (2013.01); *H04B 7/024* (2013.01);
(Continued)

(58) Field of Classification Search
None
See application file for complete search history.

(56) References Cited

U.S. PATENT DOCUMENTS

| 6,445,917 B1 | 9/2002 | Bark et al. |
| 6,952,455 B1 | 10/2005 | Banister |

(Continued)

FOREIGN PATENT DOCUMENTS

| CN | 101971681 A | 2/2011 |
| CN | 102340826 A | 2/2012 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 11)", 3GPP TS 36.211 V11.2.0, (Feb. 2013), 109 pgs.

(Continued)

*Primary Examiner* — Mohammad Adhami
*Assistant Examiner* — Raul Rivas
(74) *Attorney, Agent, or Firm* — Schwegman Lundberg & Woessner, P.A.

(57) ABSTRACT

Embodiments of an enhanced Node B (eNB) and method for RRC connection establishment for small-data transfers in a 3GPP LTE network are generally described herein. The eNB may receive a small-data RRC connection request message from user equipment (UE) that may include an establishment clause value indicating small-data traffic either with or without mobility. The eNB may send an initial UE setup request message to inform the mobility management entity (MME) that a small-data RRC connection is being established. The eNB may receive an acceptance message from the MME for the small-data RRC connection which may include a reduction of an RRC inactivity timer for fast (Continued)

connection release. The eNB may send an RRC connection reconfiguration message to the UE in response to receipt of the acceptance to establish the small-data RRC connection, the RRC connection reconfiguration message including a measurement information element (IE) when mobility is to be supported.

20 Claims, 3 Drawing Sheets

Related U.S. Application Data

(60) Provisional application No. 61/808,597, filed on Apr. 4, 2013.

(51) Int. Cl.

| | | |
|---|---|---|
| *H04B 7/024* | (2017.01) | |
| *H04W 24/02* | (2009.01) | |
| *H04W 74/08* | (2009.01) | |
| *H04W 36/30* | (2009.01) | |
| *H04B 1/38* | (2015.01) | |
| *H04W 76/00* | (2018.01) | |
| *H04W 76/02* | (2009.01) | |
| *H04W 24/08* | (2009.01) | |
| *H04L 12/26* | (2006.01) | |
| *H04W 4/00* | (2018.01) | |
| *H04W 68/02* | (2009.01) | |
| *H04L 12/18* | (2006.01) | |
| *H04L 29/08* | (2006.01) | |
| *H04W 8/00* | (2009.01) | |
| *H04W 56/00* | (2009.01) | |
| *H04W 72/12* | (2009.01) | |
| *H04L 5/14* | (2006.01) | |
| *H04W 36/00* | (2009.01) | |
| *H04L 1/18* | (2006.01) | |
| *H04B 7/0456* | (2017.01) | |
| *H04B 7/06* | (2006.01) | |
| *H04W 76/04* | (2009.01) | |
| *H04W 76/06* | (2009.01) | |
| *H04W 84/12* | (2009.01) | |
| *H04W 84/04* | (2009.01) | |
| *H04W 88/02* | (2009.01) | |
| *H04L 29/06* | (2006.01) | |
| *H04W 92/20* | (2009.01) | |
| *H04W 88/08* | (2009.01) | |
| *H04W 36/38* | (2009.01) | |
| *H04W 36/14* | (2009.01) | |
| *H04W 36/36* | (2009.01) | |

(52) U.S. Cl.
CPC .......... *H04L 1/1854* (2013.01); *H04L 5/0053* (2013.01); *H04L 5/0055* (2013.01); *H04L 5/0094* (2013.01); *H04L 5/14* (2013.01); *H04L 12/18* (2013.01); *H04L 43/0823* (2013.01); *H04L 65/1016* (2013.01); *H04L 65/4076* (2013.01); *H04L 65/4092* (2013.01); *H04L 67/02* (2013.01); *H04L 67/1076* (2013.01); *H04W 4/005* (2013.01); *H04W 8/005* (2013.01); *H04W 24/02* (2013.01); *H04W 24/08* (2013.01); *H04W 36/0088* (2013.01); *H04W 36/0094* (2013.01); *H04W 36/30* (2013.01); *H04W 56/001* (2013.01); *H04W 68/02* (2013.01); *H04W 72/042* (2013.01); *H04W 72/048* (2013.01); *H04W 72/0446* (2013.01); *H04W 72/0486* (2013.01); *H04W 72/1215* (2013.01); *H04W 72/1263* (2013.01); *H04W 74/0808* (2013.01); *H04W 76/00* (2013.01); *H04W 76/02* (2013.01); *H04W 76/022* (2013.01); *H04W 76/025* (2013.01); *H04W 76/046* (2013.01); *H04W 76/048* (2013.01); *H04W 76/06* (2013.01); *H04B 7/0456* (2013.01); *H04B 7/0639* (2013.01); *H04L 5/0007* (2013.01); *H04L 65/105* (2013.01); *H04L 65/1006* (2013.01); *H04W 36/14* (2013.01); *H04W 36/36* (2013.01); *H04W 36/38* (2013.01); *H04W 76/04* (2013.01); *H04W 76/041* (2013.01); *H04W 76/068* (2013.01); *H04W 84/045* (2013.01); *H04W 84/12* (2013.01); *H04W 88/02* (2013.01); *H04W 88/08* (2013.01); *H04W 92/20* (2013.01)

(56) References Cited

U.S. PATENT DOCUMENTS

| | | |
|---|---|---|
| 8,619,654 B2 | 12/2013 | Yang et al. |
| 8,644,815 B2 | 2/2014 | Ishii et al. |
| 8,712,401 B2 | 4/2014 | Yoo et al. |
| 8,718,662 B2 | 5/2014 | Shan et al. |
| 8,818,376 B2 | 8/2014 | Yiu et al. |
| 9,042,315 B2 | 5/2015 | Lin et al. |
| 9,160,515 B2 | 10/2015 | Yiu et al. |
| 9,191,178 B2 | 11/2015 | Koc et al. |
| 9,258,104 B2 | 2/2016 | Bashar et al. |
| 9,392,610 B2 | 7/2016 | Jung et al. |
| 9,445,338 B2 | 9/2016 | He et al. |
| 9,674,757 B2 | 6/2017 | Yiu et al. |
| 9,794,876 B2 | 10/2017 | Choi et al. |
| 2002/0163933 A1 | 1/2002 | Benveniste |
| 2002/0090965 A1 | 7/2002 | Chen et al. |
| 2003/0013452 A1 | 1/2003 | Hunt et al. |
| 2006/0068793 A1 | 3/2006 | Van Lieshout et al. |
| 2006/0084438 A1 | 4/2006 | Kwon |
| 2006/0268675 A1 | 11/2006 | Cho et al. |
| 2008/0159417 A1 | 7/2008 | Yin et al. |
| 2008/0176577 A1 | 7/2008 | Bourlas et al. |
| 2008/0186893 A1 | 8/2008 | Kolding et al. |
| 2009/0005057 A1 | 1/2009 | Lee et al. |
| 2009/0040955 A1 | 2/2009 | Jung et al. |
| 2009/0059871 A1 | 3/2009 | Nader et al. |
| 2009/0116573 A1 | 5/2009 | Gaal et al. |
| 2009/0124261 A1 | 5/2009 | Shimomura |
| 2009/0245182 A1 | 10/2009 | Abraham et al. |
| 2009/0268645 A1 | 10/2009 | Chindapol et al. |
| 2009/0290555 A1 | 11/2009 | Yaron et al. |
| 2009/0305698 A1 | 12/2009 | Zhang et al. |
| 2009/0323638 A1 | 12/2009 | Catovic et al. |
| 2010/0113008 A1 | 5/2010 | Wang et al. |
| 2010/0130237 A1 | 5/2010 | Kitazoe et al. |
| 2010/0208698 A1 | 8/2010 | Lu et al. |
| 2010/0234037 A1 | 9/2010 | Terry et al. |
| 2010/0267407 A1 | 10/2010 | Liao et al. |
| 2010/0303039 A1 | 12/2010 | Zhang et al. |
| 2010/0310004 A1 | 12/2010 | Li et al. |
| 2010/0311420 A1 | 12/2010 | Reza et al. |
| 2011/0007673 A1 | 1/2011 | Ahn et al. |
| 2011/0019776 A1 | 1/2011 | Zhang et al. |
| 2011/0021154 A1 | 1/2011 | Marinier et al. |
| 2011/0128865 A1 | 6/2011 | Doppler et al. |
| 2011/0149813 A1 | 6/2011 | Parkvall et al. |
| 2011/0176461 A1 | 7/2011 | Astely et al. |
| 2011/0188376 A1 | 8/2011 | Stupar et al. |
| 2011/0194433 A1 | 8/2011 | Song et al. |
| 2011/0217973 A1 | 9/2011 | Sagfors et al. |
| 2011/0235602 A1 | 9/2011 | Ji et al. |
| 2011/0243039 A1 | 10/2011 | Papasakellariou et al. |
| 2011/0256861 A1 | 10/2011 | Yoo et al. |
| 2011/0261729 A1 | 10/2011 | Ahn et al. |
| 2011/0263256 A1 | 10/2011 | Yavuz et al. |
| 2011/0263262 A1 | 10/2011 | Min et al. |
| 2011/0286346 A1 | 11/2011 | Barbieri et al. |

(56) References Cited

U.S. PATENT DOCUMENTS

| | | |
|---|---|---|
| 2012/0106475 A1 | 5/2012 | Jung |
| 2012/0120908 A1 | 5/2012 | Ahn et al. |
| 2012/0127938 A1 | 5/2012 | Lv et al. |
| 2012/0134338 A1 | 5/2012 | Ko et al. |
| 2012/0163296 A1 | 6/2012 | Cheon et al. |
| 2012/0275365 A1 | 11/2012 | Anderson et al. |
| 2012/0300738 A1 | 11/2012 | Palanki et al. |
| 2012/0327821 A1 | 12/2012 | Lin et al. |
| 2012/0329501 A1 | 12/2012 | Balck et al. |
| 2013/0010769 A1 | 1/2013 | Kang et al. |
| 2013/0012182 A1 | 1/2013 | Liao |
| 2013/0016604 A1 | 1/2013 | Ko et al. |
| 2013/0021991 A1 | 1/2013 | Ko et al. |
| 2013/0028235 A1 | 1/2013 | Barrett |
| 2013/0044652 A1 | 2/2013 | Wang et al. |
| 2013/0051214 A1 | 2/2013 | Fong et al. |
| 2013/0051338 A1 | 2/2013 | Ryu et al. |
| 2013/0084873 A1 | 4/2013 | Sharony et al. |
| 2013/0100895 A1 | 4/2013 | Aghili et al. |
| 2013/0196664 A1 | 8/2013 | Yiu et al. |
| 2013/0208610 A1 | 8/2013 | Mach |
| 2013/0225171 A1 | 8/2013 | Singh et al. |
| 2013/0229971 A1 | 9/2013 | Siomina et al. |
| 2013/0242880 A1 | 9/2013 | Miao et al. |
| 2013/0265945 A1 | 10/2013 | He et al. |
| 2013/0265955 A1 | 10/2013 | Kim et al. |
| 2013/0272148 A1 | 10/2013 | Fong et al. |
| 2013/0279372 A1 | 10/2013 | Jain et al. |
| 2013/0301501 A1 | 11/2013 | Olvera-Hernandez et al. |
| 2013/0303231 A1 | 11/2013 | Yiu et al. |
| 2013/0322235 A1 | 12/2013 | Khoryaev et al. |
| 2013/0324174 A1 | 12/2013 | Mueck |
| 2014/0003301 A1 | 1/2014 | Madan et al. |
| 2014/0031028 A1 | 1/2014 | Yamada et al. |
| 2014/0078941 A1 | 3/2014 | Seo et al. |
| 2014/0092785 A1 | 4/2014 | Song et al. |
| 2014/0133395 A1 | 5/2014 | Nam et al. |
| 2014/0161007 A1 | 6/2014 | Donthi et al. |
| 2014/0185550 A1 | 7/2014 | Han et al. |
| 2014/0241150 A1 | 8/2014 | Ng et al. |
| 2014/0241287 A1 | 8/2014 | Cheng et al. |
| 2014/0269459 A1 | 9/2014 | Fan et al. |
| 2014/0286255 A1 | 9/2014 | Nam et al. |
| 2014/0286276 A1 | 9/2014 | Lunttila et al. |
| 2014/0293881 A1 | 10/2014 | Khoshnevis et al. |
| 2014/0293897 A1 | 10/2014 | Kuo |
| 2014/0293900 A1 | 10/2014 | Takeda et al. |
| 2014/0295858 A1 | 10/2014 | Li et al. |
| 2014/0301288 A1 | 10/2014 | Koc et al. |
| 2014/0301290 A1 | 10/2014 | He et al. |
| 2014/0301354 A1 | 10/2014 | Davydov et al. |
| 2014/0302851 A1 | 10/2014 | Yiu et al. |
| 2014/0302887 A1 | 10/2014 | Bashar et al. |
| 2015/0078335 A1 | 3/2015 | Sivanesan et al. |
| 2015/0085785 A1 | 3/2015 | Kim et al. |
| 2015/0111581 A1 | 4/2015 | Yiu et al. |
| 2015/0189658 A1 | 7/2015 | Zhang et al. |
| 2015/0257094 A1 | 9/2015 | Wei et al. |
| 2015/0289144 A1 | 10/2015 | Yi et al. |
| 2015/0296487 A1 | 10/2015 | Takeda et al. |
| 2015/0304925 A1 | 10/2015 | Hwang et al. |
| 2016/0029234 A1 | 1/2016 | Zhang et al. |
| 2016/0050706 A1 | 2/2016 | Zhang et al. |
| 2016/0057701 A1 | 2/2016 | Choi et al. |
| 2016/0066243 A1 | 3/2016 | Yiu et al. |
| 2017/0064696 A1 | 3/2017 | He et al. |

FOREIGN PATENT DOCUMENTS

| | | |
|---|---|---|
| CN | 102387495 A | 3/2012 |
| CN | 102754496 A | 10/2012 |
| CN | 105027468 A | 11/2015 |
| CN | 105027469 A | 11/2015 |
| CN | 105103634 A | 11/2015 |
| CN | 105122673 A | 12/2015 |
| CN | 105265016 A | 1/2016 |
| CN | 106060912 A | 10/2016 |
| EP | 2434818 A1 | 3/2012 |
| EP | 2533589 A1 | 12/2012 |
| EP | 2568758 A1 | 3/2013 |
| EP | 2738950 A2 | 6/2014 |
| EP | 2784970 A2 | 10/2014 |
| HK | 1216952 A1 | 12/2016 |
| HK | 1216953 A1 | 12/2016 |
| HK | 1220068 A1 | 4/2017 |
| JP | 20104587 A | 2/2010 |
| TW | 201141288 A | 11/2011 |
| TW | 201445961 A | 12/2014 |
| TW | 201445991 A | 12/2014 |
| TW | 201446039 A | 12/2014 |
| TW | 201446056 A | 12/2014 |
| TW | I513349 B | 12/2015 |
| TW | I528851 B | 4/2016 |
| TW | I544771 B | 8/2016 |
| TW | 201640944 A | 11/2016 |
| TW | 201731331 A | 9/2017 |
| WO | WO-2008112126 A1 | 9/2008 |
| WO | WO-2010133043 A1 | 11/2010 |
| WO | WO-2011020062 A2 | 2/2011 |
| WO | WO-2011119680 A2 | 9/2011 |
| WO | WO-2011119750 A1 | 9/2011 |
| WO | WO-2011156967 | 12/2011 |
| WO | WO-2012090357 A1 | 7/2012 |
| WO | WO-2012111993 A2 | 8/2012 |
| WO | WO-2012134530 A1 | 10/2012 |
| WO | WO-2012138091 A2 | 10/2012 |
| WO | WO-2012148195 A2 | 11/2012 |
| WO | WO-2012149898 A1 | 11/2012 |
| WO | WO-2012167106 A1 | 12/2012 |
| WO | WO-2013015588 A2 | 1/2013 |
| WO | WO-2013017006 A1 | 2/2013 |
| WO | WO-2014158235 A1 | 10/2014 |
| WO | WO-2014158264 A1 | 10/2014 |
| WO | WO-2014158268 A1 | 10/2014 |
| WO | WO-2014158274 A1 | 10/2014 |
| WO | WO-2014163686 A1 | 10/2014 |
| WO | WO-2014163690 A1 | 10/2014 |
| WO | WO-2014165517 A1 | 10/2014 |
| WO | WO-2014165603 A1 | 10/2014 |
| WO | WO-2014165656 A1 | 10/2014 |
| WO | WO-2014165657 A1 | 10/2014 |
| WO | WO-2014165690 A1 | 10/2014 |

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.1.0, (Dec. 2012), 160 pgs.

"3rd Generation Partnership Project; Technical Specification Group Radio Access Network; Evolved Universal Terrestrial Radio Access (E-UTRA); Physical layer procedures (Release 11)", 3GPP TS 36.213 V11.2.0, (Feb. 2013), 173 pgs.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, figure 5.3.3.1-1., [Online]. Retrieved from the Internet: <http://www.3gpp.org/DynaReport/36331.htm>, (Mar. 18, 2013), 108, 129.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.3.0, (Mar. 2013), 344 pgs.

"3rd Generation Partnership Project; Technical Specification Group Services and System Aspects; Architecture enhancements to facilitate communications with packet data networks and applications (Release 12)", 3GPP TS 23.682 V12.0.0, (Dec. 2013), 33 pgs.

"3rd Generation Partnership Project; Technical Specification Group Services and System Aspects; Feasibility study on 3GPP system to Wireless Local Area Network (WLAN) interworking (Release 12)", 3GPP TR 22.934 V12.0.0, (Oct. 2014), 30 pgs.

(56) References Cited

OTHER PUBLICATIONS

"3rd Generation Partnership Project; Technical Specification Group Services and System Aspects; Machine-Type and other Mobile Data Applications Communications Enhancements (Release 12)", 3GPP TR 23.887 V0.8.0, (Feb. 2013), 107 pgs.
"6.3.2—Radio resource control information elements", ETSI TS 136 331 V11.5.0: LTE; Evolved Universal Terrestrial Radio Access (E-UTRA); Radio Resource Control (RRC); Protocol specification (3GPP TS 36.331 version 11.5.0 Release 11), (Sep. 2013), 187-231.
"7.6.1—Introduction", ETSI TS 136 133 V11.6.0: LTE: Evolved Universal Terrestrial Radio Access (E-UTRA); Requirements for support of radio resource management (3GPP TS 36.133 version 11.6.0 Release 11), (Oct. 2013), 58-59.
"Analysis and initial evaluation results for overhead reduction and control signaling enhancements", 3GPP TSG RAN WG1 Meeting #72 R1-130022, (2013), 6 pgs.
"U.S. Appl. No. 14/107,947, Non Final Office Action dated May 1, 2015", 17 pgs.
"U.S. Appl. No. 14/107,947, Notice of Allowance dated May 15, 2015", 15 pgs.
"U.S. Appl. No. 14/124,217, Final Office Action dated Sep. 17, 2015", 10 pgs.
"U.S. Appl. No. 14/124,217, Non Final Office Action dated Jun. 30, 2015", 9 pgs.
"U.S. Appl. No. 14/124,217, Preliminary Amendment filed Dec. 5, 2013", 3 pgs.
"U.S. Appl. No. 14/124,217, Response filed Aug. 21, 2015 to Non Final Office Action dated Jun. 30, 2015", 12 pgs.
"U.S. Appl. No. 14/137,500, Examiner Interview dated Jun. 29, 2015", 3 pgs.
"U.S. Appl. No. 14/137,500, Non Final Office Action dated May 19, 2015", 8 pgs.
"U.S. Appl. No. 14/137,500, Notice of Allowance dated Sep. 1, 2015", 8 pgs.
"U.S. Appl. No. 14/137,500, Response filed Apr. 13, 2015 to Restriction Requirement dated Mar. 17, 2015", 6 pgs.
"U.S. Appl. No. 14/137,500, Response filed Jun. 30, 2015 to Non Final Office Action dated May 19, 2015", W/ Applicant Interview, 13 pgs.
"U.S. Appl. No. 14/137,500, Restriction Requirement dated Mar. 17, 2015", 6 pgs.
"U.S. Appl. No. 14/140,932, Notice of Allowance dated Jun. 25, 2015", 9 pgs.
"U.S. Appl. No. 14/141,179, Non Final Office Action dated Aug. 25, 2015", 15 pgs.
"U.S. Appl. No. 14/141,876, Non Final Office Action dated Aug. 13, 2015", 9 pgs.
"U.S. Appl. No. 14/142,021, Non Final Office Action dated Sep. 18, 2015", 18 pgs.
"Application Serial No. PCT/US2013/068766, International Preliminary Report on Patentability dated Oct. 8, 2015", 7 pgs.
"Application Serial No. PCT/US2013/077142, International Preliminary Report on Patentability dated Oct. 8, 2015", 7 pgs.
"Application Serial No. PCT/US2013/077764, International Preliminary Report on Patentability dated Oct. 8, 2015", 6 pgs.
"Discussion and Recommendation for D2D channel modelling", NEC Group, R1-130376, 3GPP TSG RAN WG1 Meeting #72, (2013), 1-8.
"Discussion on spectral efficiency improvement for small cell enhancements", 3GPP TSG RAN WG1 Meeting #72 R1-130354, (2013), 6 pgs.
"Evaluation Assumptions on Schemes to Enhance Small Cell Spectral Efficiency", 3GPP TSG RAN WG1 Meeting #72 R1-130491, (2013), 4 pgs.
"International Application Serial No. PCT/US2013/068766, International Search Report dated Feb. 21, 2014", 3 pgs.
"International Application Serial No. PCT/US2013/068766, Written Opinion dated Feb. 21, 2014", 5 pgs.
"International Application Serial No. PCT/US2013/075726, International Preliminary Report on Patentability dated Oct. 15, 2015", 7 pgs.
"International Application Serial No. PCT/US2013/075726, International Search Report dated Apr. 10, 2014", 3 pgs.
"International Application Serial No. PCT/US2013/075726, Written Opinion dated Apr. 10, 2014", 5 pgs.
"International Application Serial No. PCT/US2013/077142, International Search Report dated Apr. 25, 2014", 4 pgs.
"International Application Serial No. PCT/US2013/077142, Written Opinion dated Apr. 25, 2014", 5 pgs.
"International Application Serial No. PCT/US2013/077163, International Preliminary Report on Patentability dated Oct. 15, 2015", 10 pgs.
"International Application Serial No. PCT/US2013/077163, International Search Report dated Apr. 25, 2014", 3 pgs.
"International Application Serial No. PCT/US2013/077163, Written Opinion dated Apr. 25, 2014", 8 pgs.
"International Application Serial No. PCT/US2013/077255, International Preliminary Report on Patentability dated Oct. 8, 2015", 8 pgs.
"International Application Serial No. PCT/US2013/077255, International Search Report dated Apr. 21, 2014", 3 pgs.
"International Application Serial No. PCT/US2013/077255, Written Opinion dated Apr. 21, 2014", 6 pgs.
"International Application Serial No. PCT/US2013/077764, International Search Report dated April 24, 2014", 3 pgs.
"International Application Serial No. PCT/US2013/077764, Written Opinion dated Apr. 24, 2014", 4 pgs.
"International Application Serial No. PCT/US2014/032532, International Search Report dated Jul. 24, 2014", 3 pgs.
"International Application Serial No. PCT/US2014/032532, Written Opinion dated Jul. 24, 2014", 4 pgs.
"International Application Serial No. PCT/US2014/032697, International Preliminary Report on Patentability dated Oct. 15, 2015", 7 pgs.
"International Application Serial No. PCT/US2014/032697, International Search Report dated Aug. 22, 2014", 4 pgs.
"International Application Serial No. PCT/US2014/032697, Written Opinion dated Aug. 22, 2014", 5 pgs.
"International Application Serial No. PCT/US2014/032795, International Search Report dated Aug. 19, 2014", 3 pgs.
"International Application Serial No. PCT/US2014/032795, Written Opinion dated Aug. 19, 2014", 7 pgs.
"International Application Serial No. PCT/US2014/032797, International Preliminary Report on Patentability dated Oct. 15, 2015", 7 pgs.
"International Application Serial No. PCT/US2014/032797, International Search Report dated Aug. 7, 2014", 3 pgs.
"International Application Serial No. PCT/US2014/032797, Written Opinion dated Aug. 7, 2014", 4 pgs.
"International Application Serial No. PCT/US2014/032855, International Preliminary Report on Patentability dated Oct. 15, 2015", 7 pgs.
"International Application Serial No. PCT/US2014/032855, International Search Report dated Aug. 13, 2014", 3 pgs.
"International Application Serial No. PCT/US2014/032855, Written Opinion dated Aug. 13, 2014", 5 pgs.
"Overhead reduction for spectrum efficiency improvement", 3GPP TSG RAN WG1 Meeting #72 R1-130057, (2013), 4 pgs.
"Study on RAN aspects of Machine-Type and other mobile data applications Communications enhancements", 3GPP TSG-RAN Meeting #59: RP-130396, (2013), 5 pgs.
"Taiwanese Application Serial No. 103111024, Office Action dated Jul. 23, 2015", w/ English Translation, 11 pgs.
"Taiwanese Application Serial No. 103112289, Office Action dated Aug. 12, 2015", 11 pgs.
"Taiwanese Application Serial No. 103112303, Office Action dated Apr. 17, 2015", 8 pgs.
"Taiwanese Application Serial No. 103112303, Response filed Jul. 17, 2015 to Office Action dated Apr. 17, 2015", 46 pgs.
"Taiwanese Application Serial No. 103112307, Office Action dated May 21, 2015", w/ English Claims, 8 pgs.

(56) References Cited

OTHER PUBLICATIONS

"Technical Specification 3rd Generation Partnership Project; Technical Specification Group Radio Access Network; Evolved Universal Terrestrial Radio Access (E-UTRA); LTE physicallayer; General description (Release 11), hereinafter TS36.201", 3GPP TS 36.201 V11.1.0, (Dec. 2012).

"Technical Specification 3rd Generation Partnership Project; Technical Specification Group Radio Access Network; Evolved Universal Terrestrial Radio Access (E-UTRA);Radio Resource Control (RRC); Protocol specification (Release10), hereinafter TS36.331", 3GPP TS 36.331 V10.8.0, (Dec. 2012).

"Technical Specification Group Radio Access Network; Evolved Universal Terrestrial Radio Access (E-UTRA) and Evolved Universal Terrestrial Radio Access Network (E-UTRAN); Overall description; Stage 2", 3GPP TS 36.300 V11.4.0 (Release 11), (Dec. 2012), 208 pgs.

Alcatel-Lucent, et al., "LTE device to device evaluation methodology", R1-120469, 3GPP TSG-RAN1 Meeting #72, (2013), 1-7.

Electronics, LG, "Initial evaluation of DM-RS reduction for small cell", R1-130266, 3GPP TSG RAN WG1 Meeting #72, (2013).

Incorporated, Qualcomm, "Overhead reduction", R1-130594, 3GPP TSG RAN WG1 #72, (2013).

Miller, K., et al., "Adaptation algorithm for adaptive streaming over HTTP", 2012 19th International Packet Video Workshop (PV), (2012), 173-178.

New Postcom, "Evaluation scenarios and channel models for D2D communications", R1-130154, 3GPP TSG-RAN1 Meeting #72, (2013), 1-5.

Nokia, et al., "On LTE D2D Methodologies and Metrics", R1-130501, 3GPP TSG RAN WG1 Meeting #72, (2013), 1-4.

Samsung, "Evaluation assumptions for Interference control among small cells", R1-130301, 3GPP TSG-RAN WG1 #72, (2013).

ZTE, "Downlink DMRS redunction for small cell", R1-130138, 3GPP TSG RAN WG1 Meeting #72, (2013).

"U.S. Appl. No. 14/141,179, Examiner Interview Summary dated Oct. 8, 2015", 3 pgs.

"U.S. Appl. No. 14/141,179, Response filed Nov. 23, 2015 to Non Final Office Action dated Aug. 25, 2015", 12 pgs.

"U.S. Appl. No. 14/141,876, Response filed Nov. 13, 2015 to Non Final Office Action dated Aug. 13, 2015", 19 pgs.

"U.S. Appl. No. 14/777,122, Preliminary Amendment filed Sep. 15, 2015", 8 pgs.

"U.S. Appl. No. 14/778,801, Preliminary Amendment filed Sep. 21, 2015", 7 pgs.

"International Application Serial No. PCT/US2014/032532, International Preliminary Report on Patentability dated Oct. 15, 2015", 6 pgs.

"International Application Serial No. PCT/US2014/032795, International Preliminary Report on Patentability dated Oct. 15, 2015", 9 pgs.

"Taiwanese Application Serial No. 103111024, Response filed Nov. 11, 2015 to Office Action dated Jul. 23, 2015", w/ English Claims, 19 pgs.

"Taiwanese Application Serial No. 103112289, Response filed Nov. 11, 2015 to Office Action dated Aug. 12, 2015", w/ English Translation, 16 pgs.

U.S. Appl. No. 14/779,024, filed Sep. 22, 2015, Extended Paging Discontinuous Reception (DRX) Cycles in Wireless Communication Networks.

U.S. Appl. No. 14/778,801, filed Sep. 21, 2015, Dual Connectivity for Terminals Supporting One Uplink Carrier.

U.S. Appl. No. 14/777,122, filed Sep. 15, 2015, Radio Link Monitoring for EPDCCH.

U.S. Appl. No. 14/141,179, filed Dec. 26, 2013, Virtual Carrier Sensing Mechanism for Long Term Evolution (LTE).

U.S. Appl. No. 14/137,500, filed Dec. 20, 2013, Pattern Indicator Signal for New DMRS Pattern.

U.S. Appl. No. 14/845,019, filed Sep. 3, 2015, User Equipment and Methods for Handover Enhancement Using Scaled Time-to-Trigger and Time-of-Stay.

U.S. Appl. No. 14/141,876, filed Dec. 27, 2013, Reconfiguration Control Channel Resource Mapping Collision Avoidance.

U.S. Appl. No. 14/107,947 now U.S. Pat. No. 9,160,515, filed Dec. 16, 2013, User Equipment and Methods for Handover Enhancement Using Scaled Time-to-Trigger and Time-of-Stay.

U.S. Appl. No. 14/140,932 now U.S. Pat. No. 9,191,178, filed Dec. 26, 2013, Enhanced Node B and Method for RRC Connection Establishment for Small Data Transfers.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.2.0, (Dec. 2012), 340 pgs.

"U.S. Appl. No. 14/141,179, Advisory Action dated May 11, 2016", 4 pgs.

"U.S. Appl. No. 14/141,179, Examiner Interview Summary dated Apr. 4, 2016", 3 pgs.

"U.S. Appl. No. 14/141,179, Final Office Action dated Feb. 24, 2016", 18 pgs.

"U.S. Appl. No. 14/141,179, Response filed Mar. 31, 2016 to Final Office Action dated Feb. 24, 2016", 11 pgs.

"U.S. Appl. No. 14/141,876, Final Office Action dated Feb. 9, 2016", 16 pgs.

"U.S. Appl. No. 14/141,876, Notice of Allowance dated May 12, 2016", 30 pgs.

"U.S. Appl. No. 14/141,876, Response filed Apr. 11, 2016 to Final Office Action dated Feb. 9, 2016", 17 pgs.

"U.S. Appl. No. 14/845,019, Final Office Action dated Oct. 12, 2016", 46 pgs.

"U.S. Appl. No. 14/845,019, Non Final Office Action dated Jun. 17, 2016", 31 pgs.

"U.S. Appl. No. 14/845,019, Preliminary Amendment filed Jan. 6, 2016", 8 pgs.

"U.S. Appl. No. 14/845,019, Response filed Sep. 19, 2016 to Non Final Office Action dated Jun. 17, 2016", 13 pgs.

"Discussions on DL control signalling for LTE-A MU-MIMO", Samsung: 3GPP, Draft; R1-104606 MU-MIMO CONTROL SIGNALING, (Aug. 17, 2010).

"DMRS indication in DL enhanced multiple antenna transmission", Draft; R1-105273, DMRS Indication in DL Enhanced Multiple Antenna Transmission, (Oct. 14, 2010).

"European Application Serial No. 14778916.8, Extended European Search Report dated Oct. 7, 2016", 12 pgs.

"On Improved Spectrum Efficiency for Small Cell", 3GPP Draft; R1-130384, Research in Motion, [Online]retrieved from the internet: <URL:http://www.3gpp.org/ftp/tsg_ran/WG1_RL1/TSGR1_72/Docs/>, (Jan. 19, 2013).

"Taiwanese Application Serial No. 103112289, Office Action dated May 11, 2016", W/ English Translation, 18 pgs.

"Taiwanese Application Serial No. 103112289, Response filed Aug. 12, 2016 to Office Action dated May 11, 2016", W/ English Translation of Claims, 18 pgs.

"Taiwanese Application Serial No. 103112307, Response filed Nov. 6, 2015 to Office Action dated May 21, 2015", w/ English Claims, 39 pgs.

U.S. Appl. No. 14/140,932, filed Dec. 26, 2013, Enhanced Node B and Method for RRC Connection Establishment for Small Data Transfers.

"U.S. Appl. No. 14/777,122, Advisory Action dated Aug. 15, 2017", 3 pgs.

"U.S. Appl. No. 14/777,122, Response filed Aug. 4, 2017 to Final Office Action maled Jun. 6, 2017", 16 pgs.

"U.S. Appl. No. 14/778,801, Non Final Office Action dated Aug. 24, 2017", 19 pgs.

"European Application Serial No. 13880622.9, Communication Pursuant to Article 94(3) EPC dated Sep. 5, 2017", 4 pgs.

"European Application Serial No. 14779090.1, Communication Pursuant to Article 94(3) EPC dated Sep. 25, 2017", 7 pgs.

Sharp, "Methods of PDSCH HARQ-ACK report with LTE TDD inter-band CA", R1-121348, XP050599637, (Mar. 20, 2012), 7 pgs.

"3rd Generation Partnership Project ; Technical Specification Group Radio Access Network; Evolved Universal Terrestrial Radio Access (E-UTRA); Physical layer procedures (Release 11)", 3GPP Standard; 3GPP TS 36.213, 3rd Generation Partnership Project (3GPP),

(56) References Cited

OTHER PUBLICATIONS

Mobile Competence Centre; 650, Route Des Lucioles; F-06921 Sophia-Antipolis Cedex; Franc, (Mar. 15, 2013), 173 pgs.
"3rd Generation Partnership Project; Technical Specification Group Core Network and Terminals; Mobile radio interface Layer 3 specification; Core network protocols; Stage 3 (Release12)", 3GPP Standard; 3GPP TS 2 4 .0 0 8 , 3rd Generation Partnership Project (3GPP), Mobile Competence Centre ; 650, Route Deslucioles ; F-06921 Sophia-Antipolis Cedex; France,, (Dec. 19, 2012), 252 pgs.
"3rd Generation Partnership Project; Technical Specification Group Services and System Aspects; Machine-Type and other Mobile Data Applications Communications Enhancements (Release12)", 3GPP Standard; 3GPP TR 2 3 .8 8 7 , 3rd Generation Partnership Project (3GPP), Mobile Competence Centre ; 650, Route Des Lucioles ; F-06921 S0PHIA-ANTIP0LIS Cedex; France, (Dec. 18, 2012), 90 pgs.
"U.S. Appl. No. 14/777,122, Final Office Action dated Jun. 6, 2017", 10 pgs.
"U.S. Appl. No. 14/777,122, Non Final Office Action dated Jan. 23, 2017", 10 pgs.
"U.S. Appl. No. 14/777,122, Response filed May 17, 2017 to Non Final Office Action dated Jan. 23, 2017", 15 pgs.
"U.S. Appl. No. 14/779,024, Non Final Office Action dated Dec. 23, 2016", 13 pgs.
"U.S. Appl. No. 14/779,024, Notice of Allowance dated Jun. 12, 2017", 6 pgs.
"U.S. Appl. No. 14/779,024, Response filed Apr. 24, 2017 to Non Final Office Action mailede Dec. 23, 2016", 7 pgs.
"U.S. Appl. No. 14/845,019, Advisory Action dated Dec. 22, 2016", 3 pgs.
"U.S. Appl. No. 14/845,019, Notice of Allowance dated Feb. 2, 2017", 12 pgs.
"U.S. Appl. No. 14/845,019, Response filed Dec. 9, 2016 to Final Office Action dated Oct. 12, 2016", 14 pgs.
"U.S. Appl. No. 15/262,348, Final Office Action dated Jun. 1, 2017", 13 pgs.
"U.S. Appl. No. 15/262,348, Non Final Office Action dated Dec. 19, 2016", 46 pgs.
"U.S. Appl. No. 15/262,348, Response filed May 19, 2017 to Non Final Office Action dated Dec. 19, 2016", 18 pgs.
"Chinese Application Serial No. 201480010992.4, Office Action dated Jul. 4, 2017", not in English, 5 pgs.
"Chinese Application Serial No. 201480011258.X, Office Action dated Jun. 9, 2017", (W/ English Translation), 18 pgs.
"European Application Serial No. 13880622.9, Extended European Search Report dated Nov. 7, 2016", 11 pgs.
"European Application Serial No. 13880622.9, Response filed May 19, 2017 to Extended European Search Report dated Nov. 7, 2016", 8 pgs.
"European Application Serial No. 13880810.0, Extended European Search Report dated Oct. 20, 2016", 12 pgs.
"European Application Serial No. 13880810.0, Response Filed May 18, 2017 to Extended European Search Report dated Oct. 20, 2016", 9 pgs.
"European Application Serial No. 14778074.6, Extended European Search Report dated Nov. 11, 2016", 8 pgs.
"European Application Serial No. 14778657.8, Extended European Search Report dated Nov. 15, 2016", 10 pgs.
"European Application Serial No. 14778657.8, Response Filed Jun. 12, 2017 to Extended European Search Report dated Nov. 15, 2016", 9 pgs.
"European Application Serial No. 14778916.8, Response Filed May 4, 2017 to Extended European Search Report dated Oct. 7, 2016", 11 pgs.
"European Application Serial No. 14779090.1, Extended European Search Report dated Oct. 31, 2016", 9 pgs.
"European Application Serial No. 14779090.1, Response Filed May 17, 2017 to Extended European Search Report dated Oct. 31, 2016", 40 pgs.
"Extending idle mode DRX cycle by using NAS procedures", Samsung:3GPP Draft; S2-124264 UEPCOP S0LUTI0N_R2, 3rd Generation Partnership Project (3GPP),Mobile Competence Centre ; 650, Route Deslucioles ; F-06921 Sophia-Antipolis Cedex; France, (Nov. 6, 2012), 4 pgs.
"HARQ timing of PDSCH on cross-carrier scheduled Scell for TDD CA with different UL-DL configurations", 3GPP Draft; R1-123388 HARQ Timing of PDSCH on Cross-Carrier Scheduled Scell for TDD CA With Different UL-DL Configurations, 3rd Generation Partnership Project (3GPP),Mobile Competence Centre; 650, R vol. Ran WG1, no. Qingdao, China, [Online] Retrieved from the Internet : <URL:http://www.3gpp.org/ftp/tsg_ran/WGI_RL1/ TSGR1_70/Docs/>, (Aug. 5, 2012), 7 pgs.
"Introduction of longer SFN length for MTC", Samsung: 3GPP Draft; R2-100331, 3rd Generationpartnership Project (3GPP), Mobile Competence Centre ; 650, Route Deslucioles ; F-06921 Sophia-Antipolis Cedex; France, (Jan. 12, 2010), 2 pgs.
"Korean Application Serial No. 2015-7024073, Office Action dated Dec. 18, 2016", (With English Translation), 9 pgs.
"Korean Application Serial No. 2015-7024073, Response Filed Feb. 17, 2017 to Office Action dated Dec. 18, 2016", w/ English Translation of Claims, 53 pgs.
"Solutions to decrease signaling overhead in R11 eDDA", CMCC, CATT, 3GPP TSG-RAN WG2#77bis R2-121134, 3rd Generation Partnership Project (3GPP), Mobile Competence Centre; 650, Route Des Lucioles; F-06921 Sophia-Antipolis Cedex; France, vol. RAN WG2, No. Jeju, [Online] retrieved from the internet:<URL:http://www.3gpp.org/ftp/tsg_ran/WG2_RL2/ TSGR2_77bis/Docs/R2-121134.zip>, (Mar. 30, 2012), 5 pgs.
"Taiwanese Application Serial No. 105103027, Office Action dated Dec. 6, 2016", W/ English Translation, 28 pgs.
"Taiwanese Application Serial No. 105103027, Response filed Mar. 6, 2017 to Office Action dated Dec. 6, 2016", w/ English Translation, 8 pgs.
Alcatel-Lucent, et al., "Core Network assisted eNB parameters tuning for small data transfer", 3GPP Draft; S2-130943 Merged of 130085 and 130571 Clean, 3rd Genration Partnership Project (3GPP), Mobile Competence Centre; 650, Route Des Lucioles; F-06921, Sophia-Antipolis Cedex; France, vol. SA WG2, No. San Diego, California, USA, Retrieved from the Internet:<URL:http:// www.3gpp.org/ftp/tsgsa/WG2Arch/TSGS296SanDiego/Docs/>, (Apr. 2, 2013), 6 pgs.
Alcatel-Lucent, et al., "Core Network assisted eNB parameters tuning for small data transfer", 3GPP Draft; S2-124321 23887 Network Assisted Timers Setting V2-SP CW, 3rd Generation Partnership Project (3GPP), Mobile Competence Centre ; 650, Route Des Lucioles ; F-06921 Sophia-Antipolis Cedex; F, vol. SA WG2, No. New Orleans, Retrieved from the Internet:<URL:http://www. 3gpp.org/ftp/tsg_sa/WG2_Arch/TSGS294New_Orlkeans/Docs/>, (Nov. 6, 2012), 6 pgs.
Ericsson, et al., "RLF and RLM on SCell", 3GPP Draft; R2-121553—RLF and RLM on SCells, 3rd Generation Partnership Project(3GPP), Mobile Competence Centre ; 650, Route Des Lucioles ; F-06921 SOPHIA-ANTIP0LIS Cedex; France, vol. RAN WG2, No. Jeju, South Korea, (Mar. 20, 2012), 2 pgs.

ENHANCED NODE B AND METHOD FOR RRC CONNECTION ESTABLISHMENT FOR SMALL DATA TRANSFERS

PRIORITY CLAIM

This application is a continuation of U.S. patent application Ser. No. 14/140,932, filed Dec. 26, 2013, which claims priority under 35 USC 119(e) to U.S. Provisional Patent Application Ser. No. 61/808,597, filed Apr. 4, 2013, each of which is incorporated herein by reference in its entirety.

TECHNICAL FIELD

Embodiments pertain to wireless communications. Some embodiments relate to small-data transfer in 3GPP LTE networks. Some embodiments relate to machine-type communications (MTC).

BACKGROUND

Small-data transmission is becoming an issue for wireless communication especially for 4G (e.g., LTE) radios due to the burden of control signaling overhead. Compared to 3G, 4G provides an always connected data mode where the user equipment (UE) has the IP address. Whenever a UE connects to an LTE network, a default (e.g., best effort) flow is assigned to the UE along with an IP address. Besides the connection between UE and an enhanced Node B (eNB), this IP connection requires bearer establishment between the eNB and the core network. Thus, setting up a connection requires a great deal of signaling overhead. This overhead is negligible when the amount of data exchanged such as in applications such as web browsing or file transfer is very large. But a lot of other applications, such as social networking apps like Facebook, Twitter and machine-type communication (MTC) applications (e.g., smart parking meters), the amount of data transferred may be very small (e.g., hundreds of bites) compared to the signaling overhead involved in setting up and tearing down the LTE connection.

Thus there are general needs for reducing the signaling overhead for frequent small-data transmissions.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
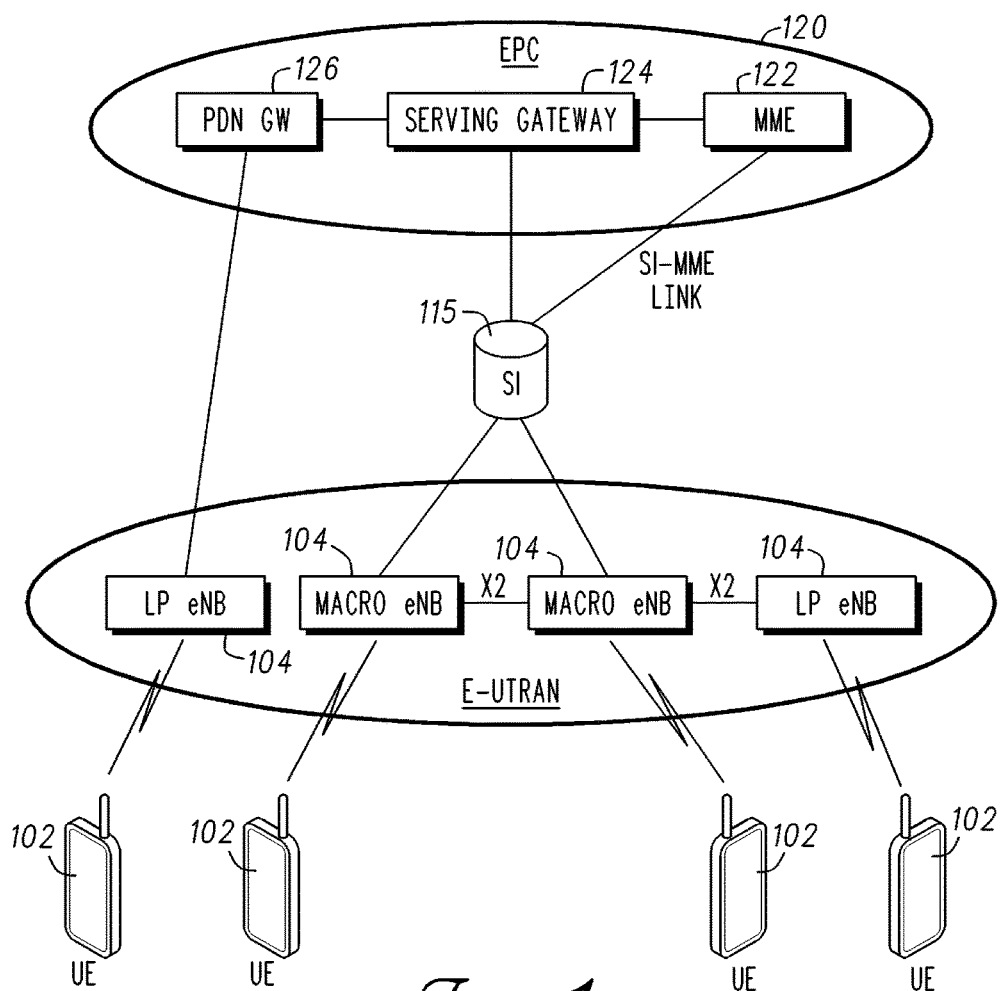
FIG. 1 shows a portion of an end-to-end network architecture of LTE (long term evolution) network with various components of the network in accordance with some embodiments.

FIG. 1 shows a portion of an end-to-end network architecture of an LTE (long term evolution) network with various components of the network in accordance with some embodiments. The network comprises a radio access network (RAN) (e.g., as depicted, the E-UTRAN or evolved universal terrestrial radio access network) and the core network 120 (e.g., shown as an evolved packet core (EPC)) coupled together through an S1 interface 115. For convenience and brevity sake, only a portion of the core network, as well as the RAN, is shown.

The core 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). It manages mobility aspects in access such as gateway selection and tracking area list management. The serving GW 124 terminates the interface toward the RAN, and routes data packets between the RAN and core network. In addition, it may be a local mobility anchor point for inter-eNB handovers and also may provide an anchor for inter-3GPP mobility. Other responsibilities may include lawful intercept, charging, and some policy enforcement. The Serving GW and the MME may be implemented in one physical node or separate physical nodes. The PDN GW terminates an SGi interface toward the packet data network (PDN). It routes data packets between the EPC and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW and the Serving GW may be implemented in one physical node or separated physical nodes.

The eNB (macro and micro) terminates the air interface protocol and is usually (if not always) the first point of contact for a UE 102. In some embodiments, an eNB may fulfill various logical functions for the RAN including but not limited to RNC (radio network controller functions) such as radio bearer management, uplink and downlink dynamic radio resource management and data packet scheduling, and mobility management.

The S1 interface is the interface that separates the RAN and the EPC. It is split into two parts: the S1-U, which carries traffic data between the eNB and the Serving GW, and the S1-MME, which is a signaling interface between the eNB and the MME. The X2 interface is the interface between eNBs (at least between most, as will be addressed below regarding micro eNBs). The X2 interface comprises two parts, the X2-C and X2-U. The X2-C is the control plane interface between eNBs, while the X2-U is the user plane interface between eNBs.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB 106 could be implemented with a picocell eNB since it is coupled to a macro eNB via an X2 interface. Picocell eNBs or other LP eNBs for that matter) may incorporate some or all functionality of a macro eNB. In some cases, this may be referred to as an access point base station or enterprise femtocell.

As mentioned above, small-data transmission is becoming an issue for wireless communication due to the burden of control signaling overhead particularly since the IP connection conventionally requires bearer establishment between an eNB 104 and the core network 120. Setting up a connection in the conventional manner thus requires a great deal of signaling overhead. Embodiments disclosed herein provide for a reduction in the signaling overhead for small-data transmissions. In accordance with embodiments, an eNB 104 may be configured for small-data radio-resource control (RRC) connection establishment in a 3GPP LTE network (e.g., a E-UTRAN of FIG. 1). In these embodiments, the eNB 104 may receive a small-data RRC connection request message from a UE 102. The small-data RRC connection request message may include an establishment clause value indicating small-data traffic either with or without mobility. The eNB 104 may send an initial UE setup request message to inform the MME 122 that a small-data RRC connection is being established. The eNB 104 may indicate to the MME 122 whether or not the small-data RRC connection is to be established with mobility. The eNB 104 may also receive an acceptance message from the MME 122 for the small-data RRC connection. The acceptance may include a reduction of an RRC inactivity timer for faster connection release. The eNB 104 may send an RRC connection reconfiguration message to the UE 102 in response to receipt of the acceptance to establish the small-data RRC connection. The RRC connection reconfiguration message may include a measurement information element (IE) when mobility is to be supported. These embodiments may achieve a significant reduction in control plane overhead for setting up connections for small-data transfers. These embodiments are described in more detail below.

Some conventional techniques for small-data transfer have proposed to use purely control plane solutions whereby the UE does not have to establish any data bearers and thus save time and air interface resources in setting up of connections over the air interface. However, these control plane solutions are constrained in several ways. For example, the solutions involving sending data over the control plane can be used only for traffic being sent one way (i.e. either the UE sends data to the sender (i.e. mobile originated (MO) data) or the UE receives data from the sender (i.e. mobile terminated (MT) data), but not allowing both during the connection. Another constraint is the UE may be able to send only one IP packet during the connection. Some of these constraints arise due to the absence of the UE being allocated an IP address.

Embodiments disclosed herein may help minimize the control plane overhead of setting up connections specifically for small-data transfers. These embodiments can be applied to MTC and non-MTC devices and allow multiple TCP/IP packets to be exchanged between a UE 102 and a destination.

Figure 2:
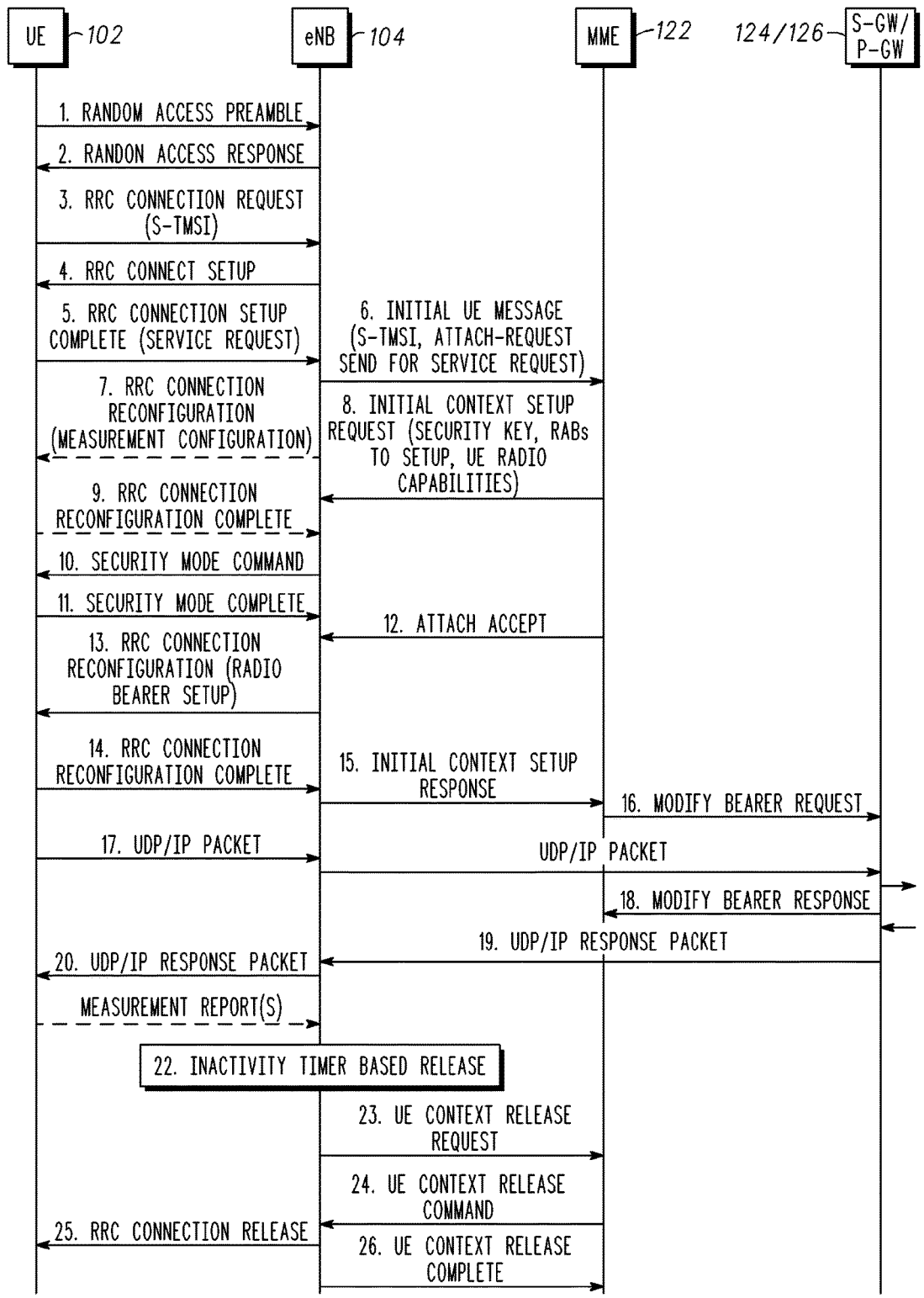
FIG. 2 illustrates an RRC connection establishment procedure.

FIG. 2 illustrates an RRC connection establishment procedure. As mentioned above, there are several steps involved in setting up a connection over the air interface between the UE 102 and the eNB 104 and between the eNB 104 and the core network EPC 120. The messages may be exchanged between the UE 102 and the eNB 104 and some of the messages may be exchanged between eNB 104, the MME 122, the S-GW 124 and the PDN-GW 126. In accordance with embodiments, some changes may be made to the steps of FIG. 2 to help minimize the control plane overhead of setting up connections for small-data transfers.

When a UE 102 needs to send data from an idle state, the UE may follow the same steps from step 1 until however, in the RRC connection request, the UE may state that the establishment cause is to do a small-data transfer. Currently this clause does not exist. Secondly the UE 102 may indicate whether it needs mobility support during the transfer or not. This provides support for non-MTC devices which may need mobility support even for small-data transfers since the device may be moving at high speeds even when transferring small data.

In step 6, when the eNB 104 forwards the UE's attach request to the MME 122, the eNB 104 may also include the information regarding small-data transfer to the MME.

In step 7, the MME 122 may validate whether this particular UE 102 can be allowed to perform small-data transfers and may send an acceptance. The MME 122 may modify the RRC inactivity timer for this connection to a very small value (e.g., to use the network RTT value such as 250 ms instead of current average of 510 secs).

In step 8, depending on whether the UE 102 indicated a need mobility support, the eNB 104 may include information to perform measurement reporting to the UE 102. If no support is required, the eNB 104 does refrain from sending such information saving air interface resources. The UE 102 may then perform a data packet transfer once it is allocated its IP address. The eNB 104 may release the UE's connection after the shorter inactivity period lasting on average the end-to-end round trip time to ensure no further packets were expected during this connection.

Figure 3:
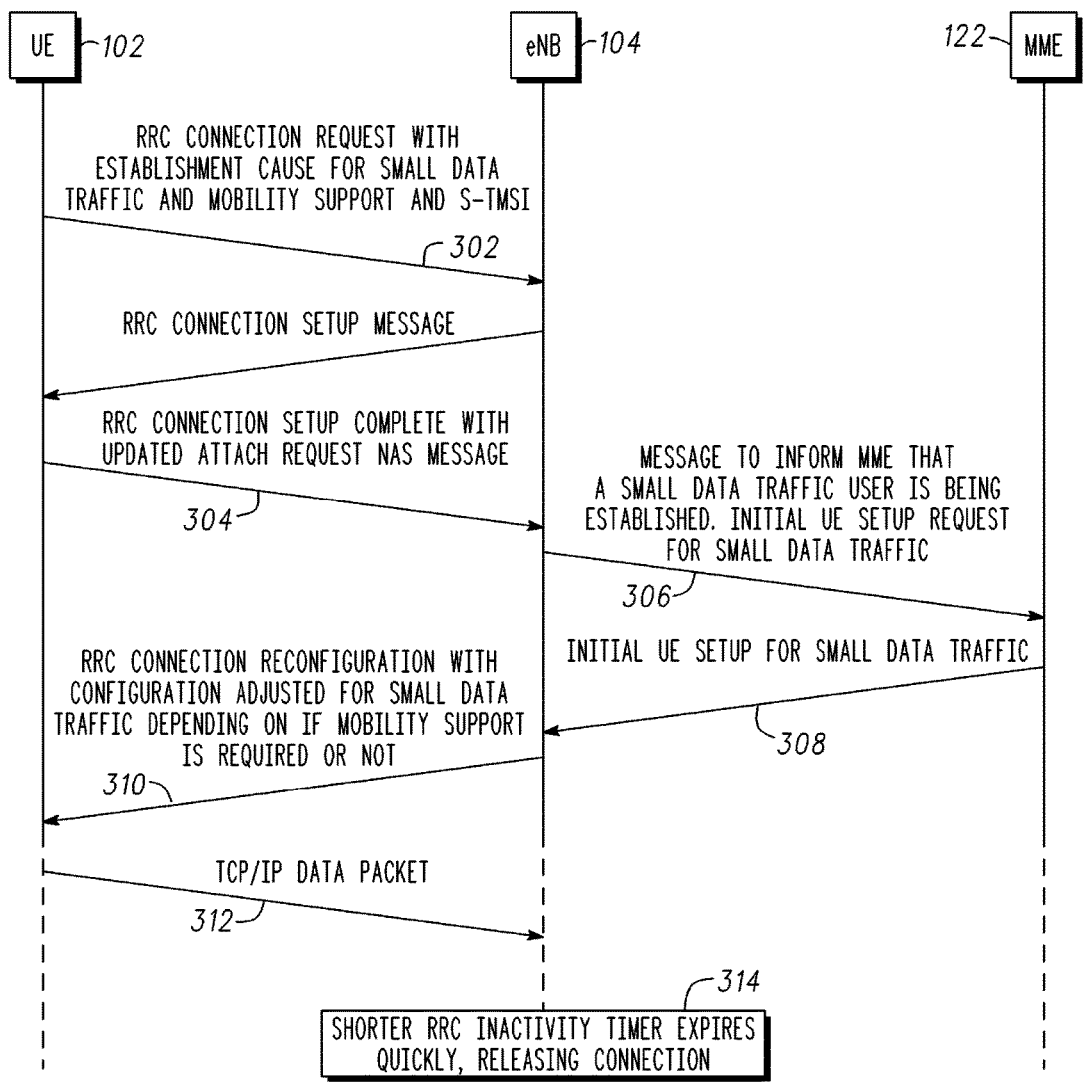
FIG. 3 illustrates an RRC connection establishment procedure for small-data transfer in accordance with some embodiments.

FIG. 3 illustrates an RRC connection establishment procedure for small-data transfer in accordance with some embodiments. In accordance with embodiments, an eNB 104 may arranged for small-data RRC connection establishment. In these embodiments, the eNB 104 may receiving a small-data RRC connection request message 302 from a UE 102. The small-data RRC connection request message 302 may include an establishment clause value indicating small-data traffic either with or without mobility. In these embodiments, the eNB 104 may send an initial UE setup request message 306 to inform the MME 122 that a small-data RRC connection for the UE 102 is being established. The eNB 104 may indicate to the MME 122 whether or not the small-data RRC connection is to be established with mobility. In these embodiments, the eNB 104 may receive an acceptance message 308 from the MME 122 for the small-data RRC connection. The acceptance may include a reduction of an RRC inactivity timer 314 for fast connection release. In these embodiments, the eNB 104 may send an RRC connection reconfiguration message 310 to the UE 102 in response to receipt of the acceptance 308 to establish the small-data RRC connection. The RRC connection reconfiguration message 310 may include a measurement information element (IE) when mobility is to be supported.

In some embodiments, indicating whether or not the small-data RRC connection is being established with mobility is part of the initial UE setup request message 306.

In some embodiments, the eNB 104 may add a field to an attach request message 304 received from the UE 102 to generate the initial UE setup request message 306. The added field may indicate small data in a dedicated non-access spectrum (NAS) information element (IE). The attach request message 304 with the added field may be forwarded by the eNB 104 to the MME 122.

no mobility IE, depending on whether mobility support required or not). The MME 122 may also send an updated RRC inactivity timer value for fast connection release. If the core network 120 knows this is a small-data transfer connection, it may not retain the tunnel information between the S-GW 124 and the eNB 104 and between PDN-GW 126 and the S-GW 124 for long periods of time and may release bearer resources earlier as well.

In Table 1, the new RRC Connection request message with a new establishment cause is illustrated.

TABLE 1

| Updated RRC Connection Request Message |  |
|---|---|
| -- ASN1START | |
| RRCConnectionRequest ::= | SEQUENCE { |
|     criticalExtensions |     CHOICE { |
|         rrcConnectionRequest-r8 |         RRCConnectionRequest-r8-IEs, |
|         criticalExtensionsFuture |         SEQUENCE { } |
|     } | |
| } | |
| RRCConnectionRequest-r8-IEs ::= | SEQUENCE { |
|     ue-Identity |     InitialUE-Identity, |
|     establishmentCause |     EstablishmentCause, |
|     spare |     BIT STRING (SIZE (1)) |
| } | |
| InitialUE-Identity ::= | CHOICE { |
|     s-TMSI |     S-TMSI, |
|     randomValue |     BIT STRING (SIZE (40)) |
| } | |
| EstablishmentCause ::= | ENUMERATED { |
| |     emergency, highPriorityAccess, mt-Access, mo-Signalling, |
| |     mo-Data, delayTolerantAccess-v1020, SmallDataTrafficwithMobilityv12, |
| SmallDataTrafficwithNoMobility-v12} | |
| -- ASN1STOP | |

In some embodiments, the eNB 104 may communicate small-data packets 312 with the UE 102 over the established small-data RRC connection prior to expiration of the reduced RRC inactivity timer. The small-data packets 312 may have a predetermined maximum size for small-data transfer.

In some embodiments, the UE 102 may be machine-type communications (MTC) device. In some embodiments, the UE 102 is a mobile device including a smart phone. In some embodiments, the small-data RRC connection request message includes an establishment clause value indicating small-data traffic without mobility. In some embodiments, the small-data RRC connection request message includes an establishment clause value indicating small-data traffic with mobility. In some embodiments, the predetermined maximum size for small-data transfer is 1-Kbyte, although the scope of the embodiments is not limited in this respect.

In accordance with embodiments, new establishment cause values are provided in an RRC Connection Request message ("small-data traffic with mobility" and "small-data traffic with no mobility"). Furthermore, new mechanisms are provided for an eNB 104 to inform the MME 122 that the connection request is a small-data transfer. In the attach request message forwarded by the eNB to the MME 122, a field may be added to indicate small-data message in the dedicated Info NAS IE. The eNB 104 may indicate to the MME 122 that this is a small-data transfer and may also indicate whether mobility support is required or not on top of attach request NAS message. When the eNB 104 receives attach accept message, the eNB 104 may send a RRC Connection Reconfiguration message (no measurement IE, Embodiments disclosed here may be applicable to small-data transmissions for both MTC and non-MTC devices. Embodiments disclosed herein may allow sending multiple IP packets and also TCP/IP packets. Embodiments disclosed herein may be flexible for mobile and non-mobile devices. Embodiments disclosed herein may reduce the impact of measurement configuration for mobile devices, saving signaling overhead. Embodiments disclosed do not compromise security. Embodiments disclosed herein may save UE power by releasing the connection quickly, also saving network resources.

In some embodiments, the packets for small-data transfer are smaller in size (e.g. in the order of hundreds of bytes) with average packet size of 100 bits and may have a predetermined maximum size of 1 Kbyte, although the scope of the embodiments is not limited in this respect. In some embodiments, an eNB 104 may refrain from including an establishment clause value indicating small-data traffic for RRC connection requests that are not for small-data traffic.

Figure 4:
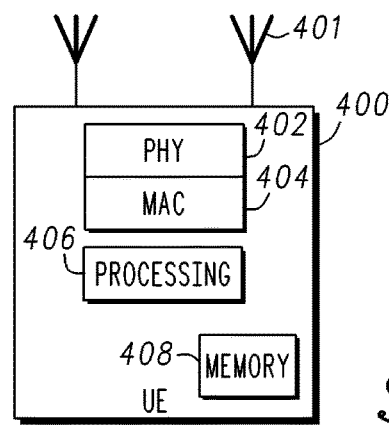
FIG. 4 illustrates a functional block diagram of a UE in accordance with some embodiments.

FIG. 4 illustrates a functional block diagram of a UE in accordance with some embodiments. UE 400 may be suitable for use as UE 102 (FIG. 1) although other UE configurations may also be suitable. The UE 400 may include physical layer circuitry 402 for transmitting and receiving signals to and from eNBs 104 (FIG. 1) using one or more antennas 401. UE 400 may also include medium access control layer (MAC) circuitry 404 for controlling access to the wireless medium. UE 400 may also include processing circuitry 406 and memory 408 arranged to perform the operations described herein. The block diagram illustrated by FIG. 4 may also be functionally suitable for an eNB, such as eNB 104 (FIG. 1) although other configurations for an eNB may also be suitable. In some embodiments, the eNB may include network interface circuitry arranged to perform at least some of the operations described herein.

In some embodiments, the UE 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 400 may include one or more of a keyboard, a display, a non-volatile memory port, multiple antennas, a graphics processor, an application processor, speakers, and other mobile device elements. The display may be an LCD screen including a touch screen.

The one or more antennas 401 utilized by the UE 400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $/1;10$ of a wavelength or more.

Although the UE 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 400 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 400 and the eNBs 104 (FIG. 1) may be configured to communicate in accordance with an orthogonal frequency division multiple access (OFDMA) technique.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 400 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some LTE embodiments, the UE 400 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 400. The CQI allows the UE 400 to propose to an eNB an optimum modulation scheme and coding rate to use for a given radio link quality so that the resulting transport block error rate would not exceed a certain value, such as 10%. In some embodiments, the UE 400 may report a wideband CQI value which refers to the channel quality of the system bandwidth. The UE 400 may also report a sub-band CQI value per sub-band of a certain number of resource blocks which may be configured by higher layers.

The full set of sub-bands may cover the system bandwidth. In case of spatial multiplexing, a CQI per code word may be reported.

In some embodiments, the PMI may indicate an optimum precoding matrix to be used by the eNB 104 for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE 400 in which two or more cooperating/coordinating points, such as remote-radio heads (RRHs) transmit jointly. In these embodiments, the joint transmissions may be MIMO transmissions and the cooperating points are configured to perform joint beamforming.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by an enhanced node B (eNB) for small-data radio-resource control (RRC) connection establishment in a 3GPP LTE network, the method comprising:
   receiving a small-data RRC connection request message from user equipment (UE), the small-data RRC connection request message including an establishment clause value indicating small-data traffic with mobility;
   sending an initial UE setup request message to inform a mobility management entity (MME) that a small-data RRC connection for the UE is being established;
   indicating to the MME that the small-data RRC connection is to be established with mobility;
   receiving an acceptance message from the MME for the small-data RRC connection, the acceptance message including a reduction of an RRC inactivity timer for fast connection release; and
   sending an RRC connection reconfiguration message to the UE in response to receipt of the acceptance to establish the small-data RRC connection, the RRC connection reconfiguration message including a measurement information element (IE) as part of support for mobility.

2. The method of claim 1 wherein indicating that the small-data RRC connection is being established with mobility is part of the initial UE setup request message.

3. The method of claim 1 further comprising adding a field to an attach request message received from the UE to generate the initial UE setup request message, the added field to indicate small data in a dedicated non-access spectrum (NAS) information element (IE), and
   wherein the attach request message with the added field is forwarded by the eNB to the MME.

4. The method of claim 1 further comprising refraining from including an establishment clause value indicating small-data traffic for RRC connection requests that are not for small-data traffic.

5. An enhanced node B (eNB) arranged for small-data radio-resource control (RRC) connection establishment, the eNB having network interface circuitry arranged to:
   receive a small-data RRC connection request message from user equipment (UE), the small-data RRC connection request message including an establishment clause value indicating small-data traffic with-mobility;
   send an initial UE setup request message to inform a mobility management entity (MME) that a small-data RRC connection for the UE is being established;
   indicate to the MME that the small-data RRC connection is to be established with mobility;
   receive an acceptance message from the MME for the small-data RRC connection, the acceptance message including a reduction of an RRC inactivity timer for fast connection release; and
   send an RRC connection reconfiguration message to the UE in response to receipt of the acceptance to establish the small-data RRC connection, the RRC connection reconfiguration message including a measurement information element (IE) when mobility is to be supported.

6. The eNB of claim 5 wherein the eNB is arranged to indicate that the small-data RRC connection is being established with mobility as part of the initial UE setup request message.

7. The eNB of claim 5 wherein the eNB is further arranged to a field to an attach request message received from the UE to generate the initial UE setup request message, the added field to indicate small data in a dedicated non-access spectrum (NAS) information element (IE), and
   wherein the attach request message with the added field is forwarded by the eNB to the MME.

8. The eNB of claim 5 wherein the eNB is further arranged to communicate small-data packets with the UE over the established small-data RRC connection prior to expiration of the reduced RRC inactivity timer,
   wherein the small-data packets have a predetermined maximum size for small-data transfer.

9. The eNB of claim 8 wherein the UE is machine-type communications (MTC) device.

10. The eNB of claim 8 wherein the small-data RRC connection request message includes an establishment clause value indicating small-data traffic without mobility.

11. The eNB of claim 8 wherein the UE is a mobile device including a smart phone.

12. The eNB of claim 8 wherein the predetermined maximum size for small-data transfer is 1-Kbyte.

13. A non-transitory computer-readable storage medium that stores instructions for execution by one or more processors to perform operations for small-data radio-resource control (RRC) connection establishment, the operations to configure an enhanced node B (eNB) to:
   receive a small-data RRC connection request message from user equipment (UE), the small-data RRC connection request message including an establishment clause value indicating small-data traffic with mobility;
   send an initial UE setup request message to inform a mobility management entity (MME) that a small-data RRC connection for the UE is being established;
   indicate to the MME that the small-data RRC connection is to be established with mobility;
   receive an acceptance message from the MME for the small-data RRC connection, the acceptance message including a reduction of an RRC inactivity timer for fast connection release; and
   send an RRC connection reconfiguration message to the UE in response to receipt of the acceptance to establish the small-data RRC connection, the RRC connection reconfiguration message including a measurement information element (IE) when mobility is to be supported.

14. The non-transitory computer readable storage medium of claim 13 wherein the operations further configure the eNB to communicate small-data packets with the UE over the established small-data RRC connection prior to expiration of the reduced RRC inactivity timer,
- wherein the small-data packets have a predetermined maximum size for small-data transfer; and
- wherein the small-data RRC connection request message includes an establishment clause value indicating small-data traffic with mobility.

15. The non-transitory computer readable storage medium of claim 13 wherein the operations further configure the eNB to communicate small-data packets with the UE over the established small-data RRC connection prior to expiration of the reduced RRC inactivity timer,
- wherein the small-data packets have a predetermined maximum size for small-data transfer.

16. The non-transitory computer readable storage medium of claim 13 wherein the UE is machine-type communications (MTC) device.

17. The non-transitory computer readable storage medium of claim 13 wherein the small-data RRC connection request message includes an establishment clause value indicating small-data traffic without mobility.

18. The non-transitory computer readable storage medium of claim 13 wherein the UE is a mobile device including a smart phone.

19. The non-transitory computer readable storage medium of claim 13 wherein the small-data RRC connection request message includes an establishment clause value indicating small-data traffic with mobility.

20. The non-transitory computer readable storage medium of claim 13 wherein the predetermined maximum size for small-data transfer is 1-Kbyte.

* * * * *